(12) United States Patent
Berenberg et al.

(10) Patent No.: US 8,681,674 B2
(45) Date of Patent: Mar. 25, 2014

(54) ACCELERATED REJOINING IN LOW POWER WIRELESS NETWORKING FOR LOGISTICS AND TRANSPORTATION APPLICATIONS

(75) Inventors: Paul Berenberg, Mountain View, CA (US); Anatoli Gostev, Cupertino, CA (US)

(73) Assignee: Cubic Corporation, San Diego, CA (US)

( * ) Notice: Subject to any disclaimer, the term of this patent is extended or adjusted under 35 U.S.C. 154(b) by 281 days.

(21) Appl. No.: 13/096,745

(22) Filed: Apr. 28, 2011

(65) Prior Publication Data
US 2012/0275361 A1 Nov. 1, 2012

(51) Int. Cl.
*H04W 76/00* (2009.01)
*H04W 52/02* (2009.01)

(52) U.S. Cl.
USPC .......................................... 370/311; 370/242

(58) Field of Classification Search
USPC ................................ 370/311, 315, 242, 338
See application file for complete search history.

(56) References Cited

U.S. PATENT DOCUMENTS

| | | | |
|---|---|---|---|
| 5,585,571 A | 12/1996 | Lonsdale et al. | |
| 5,794,146 A * | 8/1998 | Sevcik et al. | 455/434 |
| 7,830,838 B2 * | 11/2010 | Kohvakka et al. | 370/330 |
| 8,069,470 B1 | 11/2011 | Montenegro | |
| 8,208,973 B2 * | 6/2012 | Mehta | 455/574 |
| 8,363,630 B2 * | 1/2013 | Gong | 370/338 |
| 8,416,726 B2 | 4/2013 | Berenberg | |
| 2004/0006705 A1 | 1/2004 | Walker | |
| 2004/0042434 A1 | 3/2004 | Kennedy | |
| 2005/0261037 A1 | 11/2005 | Raghunath et al. | |
| 2006/0149980 A1 | 7/2006 | Zhong | |

(Continued)

FOREIGN PATENT DOCUMENTS

KR 10-2005-0104393 A 11/2005
KR 10-2010-0112869 A 10/2010

OTHER PUBLICATIONS

Dust Networks, "SmartMesh Technology Overview", obtained online on Dec. 2, 2010 at http://dustnetworks.com/technology, 4 pages.

(Continued)

*Primary Examiner* — Rasheed Gidado
(74) *Attorney, Agent, or Firm* — Kilpatrick Townsend & Stockton LLP

(57) ABSTRACT

Techniques are disclosed for enabling accelerated rejoining of network devices in a low-power wireless network after a connection to the low-power wireless network is lost. Embodiments generally include, for a network device that periodically conducts scans for beacons on the low-power wireless network, increasing the frequency, or scanning rate, at which the scans are performed. After a certain period of time, if the network device has not joined the low-power wireless network, the network device can implement a different scanning rate until it rejoins with the network. Additional techniques may be used to reduce power usage and preserve the structure of a portion of the low-power wireless network that has become disconnected with the rest of the network.

29 Claims, 10 Drawing Sheets

(56) References Cited

U.S. PATENT DOCUMENTS

| | | |
|---|---|---|
| 2006/0291657 A1 | 12/2006 | Benson et al. |
| 2007/0080800 A1 | 4/2007 | Carbone |
| 2008/0181154 A1 | 7/2008 | Sherman |
| 2009/0059827 A1 | 3/2009 | Liu et al. |
| 2010/0008272 A1* | 1/2010 | Messinger et al. ............ 370/311 |
| 2010/0046375 A1 | 2/2010 | Goldstein et al. |
| 2010/0283575 A1 | 11/2010 | Tubb et al. |
| 2010/0329232 A1 | 12/2010 | Tubb et al. |
| 2011/0298598 A1 | 12/2011 | Rhee |
| 2012/0178486 A1* | 7/2012 | Kaufmann .................... 455/515 |
| 2012/0203918 A1 | 8/2012 | Berenberg et al. |
| 2012/0275360 A1 | 11/2012 | Berenberg |

OTHER PUBLICATIONS

International Search Report and Written Opinion dated Feb. 23, 2012 for International PCT Application No. PCT/US2011/034436, 7 pages.

Polastre, Joseph et al., "A unifying link abstraction for wireless sensor networks", Proceedings of the 3$^{rd}$ International Conference on Embedded Networked Sensor Systems: ACM NY pp. 76-89, Nov. 2-4, 2005.

Zheng, Jianliang et al., A comprehensive performance study of IEEE 802.15.4, pp. 1-14.

International Search Report and Written Opinion dated Apr. 16, 2012 for International Application No. PCT/US2011/034454, 6 pages.

* cited by examiner

ACCELERATED REJOINING IN LOW POWER WIRELESS NETWORKING FOR LOGISTICS AND TRANSPORTATION APPLICATIONS

STATEMENT AS TO RIGHTS TO INVENTIONS MADE UNDER FEDERALLY SPONSORED RESEARCH AND DEVELOPMENT

The U.S. Government may have rights in this invention pursuant to Contract No. 1406-04-06-CT-60916.

BACKGROUND OF THE INVENTION

Modern networks can comprise a variety of devices, which may be connected in a variety of ways. A network can be, for example, centralized or ad hoc. In the latter case, each networked device, or node, can act as a router to forward data from other nodes, in addition to communicating its own data.

These wireless networks, however, have their limitations. For example, wireless devices powered by batteries may require frequent battery changes due to the high power cost of wireless data transmission. Because of maintenance issues, among other things, ad hoc wireless networks have may not be used in various applications for which the networks might otherwise be suitable.

BRIEF SUMMARY OF THE INVENTION

Techniques are disclosed for enabling accelerated rejoining of network devices in a low-power wireless network after a connection to the low-power wireless network is lost. Embodiments generally include, for a network device that periodically conducts scans for beacons on the low-power wireless network, increasing the frequency, or scanning rate, at which the scans are performed. After a certain period of time, if the network device has not joined the low-power wireless network, the network device can implement a different scanning rate until it rejoins with the network. Additional techniques may be used to reduce power usage and preserve the structure of a portion of the low-power wireless network that has become disconnected with the rest of the network.

An example of a network device for communicating with a wireless sensor network, according to the disclosure, includes a battery, a wireless interface, and a processing unit coupled with the battery and the wireless interface. The processing unit can be configured to cause the network device to periodically scan for beacons at a first scanning rate when the network device is associated with the wireless sensor network. Scanning for beacons can comprise operating in a mode to detect a predetermined pattern using the wireless interface. The processing unit can be configured to cause the network device to determine that the network device no longer is associated with the wireless sensor network, and periodically scan for beacons at a second scanning rate for a certain period of time after the determining the network device no longer is associated with the wireless sensor network. The second scanning rate can be higher than the first scanning rate. Finally, the processing unit can be configured to cause the network device to periodically scan for beacons at a third scanning rate if, after the certain period of time, the network device is not associated with the wireless sensor network.

The example network device can include one or more of the following features. The third scanning rate can be different than the first scanning rate. The third scanning rate can be higher than the first scanning rate. A memory can be included, where the processing unit is configured to cause the network device to store information regarding at least one other network device in the memory. The information regarding the at least one other network devices can include a timestamp, and the processing unit can be configured to cause the network device to scan for beacons at a time based, at least in part, on the timestamp. The processing unit can be configured to cause the network device to scan for beacons on a plurality of radio frequency (RF) channels. The processing unit can be configured to cause the network device to send a value, using the wireless interface, indicative of a preference corresponding to connecting with the network device. The value can comprise a first value, and the processing unit can be configured to cause the network device to send a second value, using the wireless interface, after the determining the network device no longer is associated with the wireless sensor network. The second value can be indicative of a decreased preference corresponding to connecting with the network device. The second value can be not indicative of the network device being no longer associated with the wireless sensor network. The processing unit can be configured to cause the network device to determine the network device has not been associated with the wireless sensor network for a certain length of time, and send a third value, using the wireless interface. The third value can be indicative of the network device being no longer associated with the wireless sensor network. At least one sensor communicatively coupled with the processing unit can be included.

An example method of communication in a low-power wireless network, according to the disclosure, can include periodically scanning for beacons at a first scanning rate when a network device is associated with the low-power wireless network. Scanning for beacons can comprise operating the network device in a mode to detect a predetermined pattern sent from the low-power wireless network. The example method can also include determining that the network device no longer is associated with the low-power wireless network, and periodically scanning for beacons at a second scanning rate for a certain period of time after the determining the network device no longer is associated with the low-power wireless network. The second scanning rate can be higher than the first scanning rate. The example method can also include periodically scanning for beacons at a third scanning rate if, after the certain period of time, the network device is not associated with the low-power wireless network.

The example method can include one or more of the following features. The third scanning rate can be different than the first scanning rate. The method can include storing information regarding at least one other network device. The information regarding the at least one other network devices can include a timestamp, and the method can further comprise scanning for beacons at a time based, at least in part, on the timestamp. Scanning for beacons can include scanning a plurality of radio frequency (RF) channels. The method can include sending a value indicative of a preference corresponding to connecting with the network device. The value can comprise a first value; and the method further can comprise sending a second value after the determining the network device no longer is associated with the low-power wireless network. The second value can be indicative of a decreased preference corresponding to connecting with the network device. The second value can be not indicative of the network device being no longer associated with the low-power wireless network. The method can include determining the network device has not been associated with the low-power wireless network for a certain length of time, and sending a third value. The third value can be indicative of the network device being no longer associated with the low-power wireless network.

An example of a first network device for communicating with a low-power wireless network, according to the disclosure, can include a battery, a wireless interface, and a processing unit coupled with the battery and the wireless interface. The processing unit can be configured to cause the first network device to create at least one wireless connection to associate the first network device to the low-power wireless network, periodically scan for beacons at a first scanning rate when the at least one wireless connection is maintained with the low-power wireless network, determine that the first network device has lost the at least one wireless connection with the low-power wireless network, and periodically scan for beacons at a second scanning rate for a certain period of time after determining that the first network device has lost the at least one wireless connection with the low-power wireless network. The second scanning rate can be higher than the first scanning rate. The processing unit can be configured to cause the first network device to periodically scan for beacons at a third scanning rate if, after the certain period of time, the first network device has not created a new wireless connection with the low-power wireless network.

The first network device can include one or more of the following features. The processing unit can be configured to cause the first network device to create the at least one wireless connection with either or both of a second network device and a third network device. The processing unit can be configured to cause the first network device to attempt to create a new wireless connection if a beacon is detected, and cause the first network device to omit a certain number of scans if the new wireless connection is not created. The processing unit can be configured to cause the first network device to skip a first number of scans if the attempt to create the new wireless connection occurs while the first network device is scanning at the second scanning rate, and skip a second number of scans if the attempt to create the new wireless connection occurs while the first network device is scanning at the third scanning rate. The first network device can include a memory, and the processing unit can be configured to cause the first network device to store information regarding at least one other network device in the memory. The information regarding the at least one other network devices can include a timestamp, and the processing unit can be configured to cause the first network device to scan for beacons at a time based, at least in part, on the timestamp. The processing unit can be configured to cause the first network device to send a value, using the wireless interface, indicative of a preference corresponding to connecting with the first network device. The value can comprise a first value, and the processing unit can be configured to cause the first network device to send a second value, using the wireless interface, after the determining that the first network device has lost the at least one wireless connection with the low-power wireless network. The second value can be indicative of a decreased preference corresponding to connecting with the first network device. The first network device can include at least one sensor communicatively coupled with the processing unit.

DETAILED DESCRIPTION OF THE INVENTION

Figure 1A:
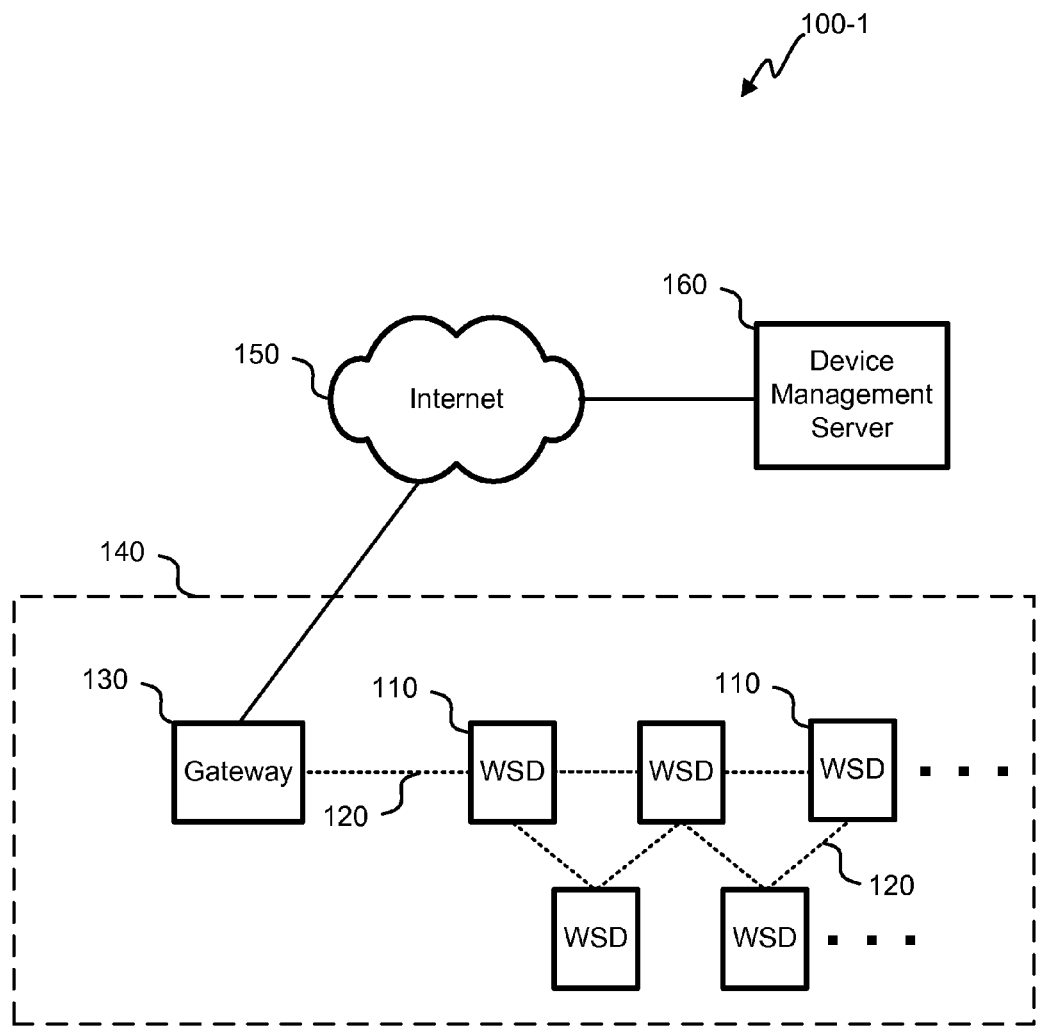
FIG. 1A is a block diagram of an embodiment of a wireless sensor network for communicating sensor information.

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, individual embodiments may be described as a process which is depicted as a flowchart, a flow diagram, a data flow diagram, a structure diagram, or a block diagram.

Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Wireless networks and wireless network devices (including wireless sensor devices (WSDs)) described herein may be configured in a variety of ways, in a variety of contexts. Example configurations include mesh, point-to-point, and/or ad hoc networks, among others. The flexible nature of these networks—enabling network devices, or nodes, to join and leave these networks dynamically—together with WSDs configured to collect and communicate sensor information, enables these networks to provide end-to-end security and management of transportation and/or logistical systems. Although disclosed embodiments focus on wireless technologies, the techniques described herein can be applied to wired communication networks, such as an ad-hoc serial interface, for example.

For example, a wireless network can comprise a plurality of WSDs providing sensor information relating to a plurality of cargo containers located in a depot. The sensor information can include data from a variety of sensors, which can indicate the temperature and/or humidity of a container, whether the container door is or has been opened, whether the container is experiencing or has experienced a shock, the location of the container, whether the container is moving, and more. The wireless network further can include a gateway device that collects the sensor information and provides it to systems outside the wireless network. As WSD-equipped containers enter and leave the depot, the wireless network will adjust accordingly, enabling WSDs of containers entering the depot to join the wireless network while the WSDs of containers leaving the depot are dropped from the wireless network. Furthermore, WSDs can act as routers to relay sensor information from other WSDs that are not in direct communication with the depot's gateway device.

Low-power wireless networks can be advantageous in transportation, logistical, and similar applications where network devices are mobile devices operating on battery power. Although many battery-operated mobile devices utilize wireless technologies, most mobile devices exhaust their batteries in a matter of hours or days. The term "low-power wireless networks" as used herein refers to wireless networks utilizing technologies that enable battery-powered devices to operate for a year or more without exhausting their batteries. This can include technologies associated with the IEEE 802.15.4 and/or ISO/IEC 18000-7 standards, as well as various proprietary technologies, among others.

FIG. 1A is a block diagram of an embodiment of a logistical management system 100-1. In this embodiment, a plurality of WSDs 110 are networked together to generate and communicate sensor data. A WSD 110 gathering sensor information can communicate the sensor information toward a gateway 130 using a wireless connection 120. If there are one or more WSDs 110 communicatively linked between the WSD 110 originating the sensor information and the gateway 130, the one or more WSDs 110 will relay the sensor information until it reaches the gateway 130. The logistical management system 100-1 depicted in FIG. 1A is shown as an example and is not limiting. The sensor network 140 can be configured in a variety of ways. For instance, the gateway 130 can connect with multiple WSDs 110, and WSDs 110 can have more or fewer wireless connections 120 than indicated in FIG. 1A. Moreover, multiple gateways 130 and/or sensor networks 140 may be included in a logistical management system 100.

The gateway 130 provides connectivity between sensor network 140—comprising the gateway 130 and WSDs 110—and a device management server (DMS) 160. Communication between the gateway 130 and the DMS 160 can be relayed through the Internet 150, or any other Wide Area Network (WAN). Additionally or alternatively, other networks, such as Local Area Networks (LANs), can be used. Other configurations can include a gateway 130 communicating directly with the DMS 160 without a separate network.

The DMS 160 provides an interface between the sensor network 140 that can be used by a human user or another system, by utilizing, for example, a graphical user interface (GUI) and/or an application programmable interface (API). The DMS 160 can collect and store information from the WSDs 110. The data communicated between the DMS 160 and the gateway 130 can be securely communicated in encrypted packets, and the DMS 160 can provide secure management of the collected data.

One or more of a variety of physical layers may be used to provide the wireless connections 120 of the sensor network 140. According to one embodiment, the WSDs 110 and gateway 130 communicate using a protocol stack based on IEEE 802.15.4 standard at 2.4 GHz using all 16 channels available in that standard. This physical layer enables the sensor network 140 to operate using very low power and/or predictable power consumption—which can be an important consideration for embodiments in which the WSDs 110 and/or gateway 130 operate on battery power. Nonetheless, other wireless technologies may be used, including IEEE 802.15.4 at 900 MHz; IEEE 802.11; Bluetooth®; IEEE 802.16; Ultra Wideband (UWB); 433 MHz Industrial, Scientific, and Medical (ISM) Band; cellular; optical; and more, using use multiple RF channels (e.g., narrow-band frequency hopping) or a single RF channel. The gateway 130 can communicate with the Internet 150 through a wired connection and/or a wireless connection, as shown in FIG. 1B.

Figure 1B:
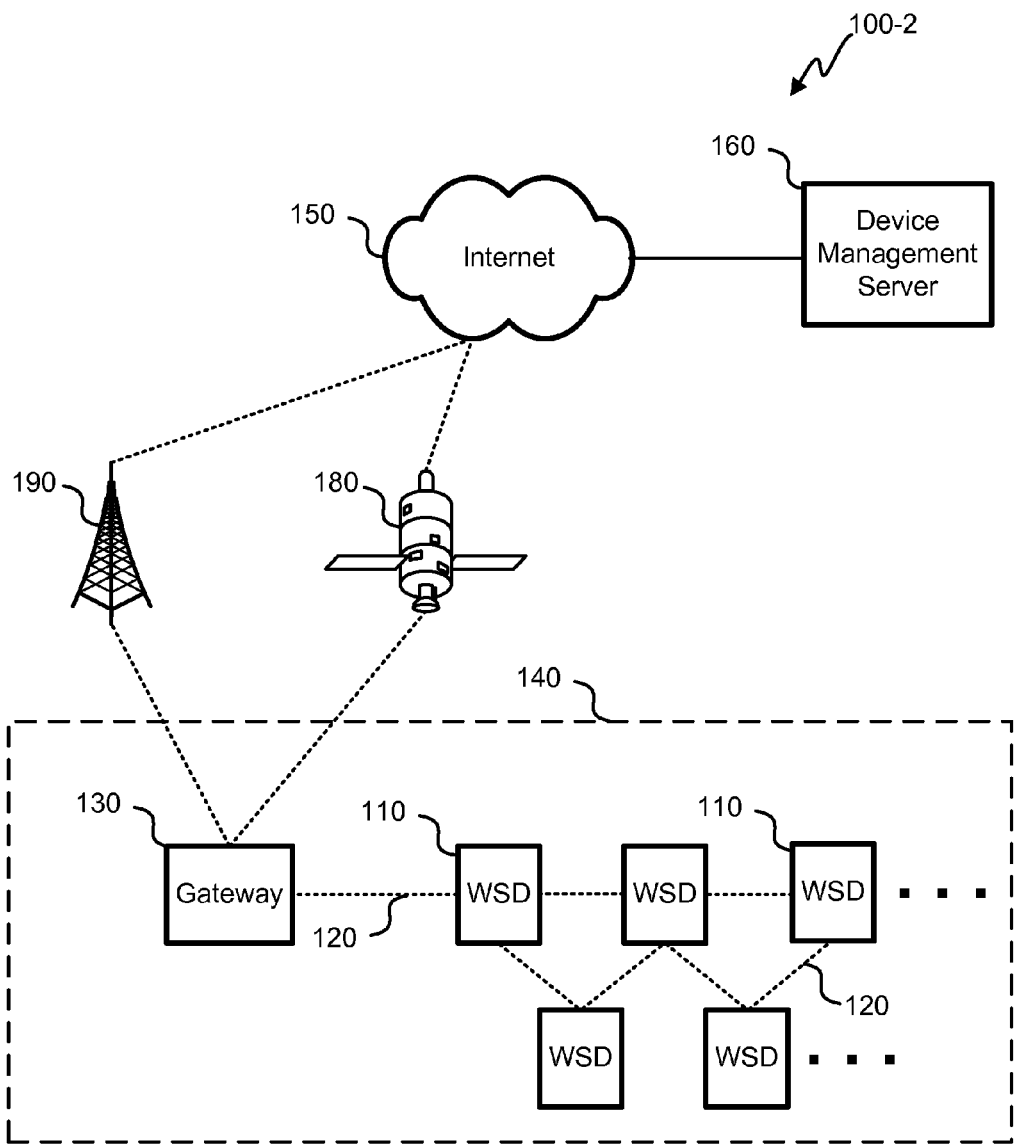
FIG. 1B is a block diagram of another embodiment of a wireless sensor network for communicating sensor information, in which a gateway device is wirelessly connected with the Internet.

FIG. 1B is a block diagram of an alternative embodiment of a logistical management system 100-2. In this embodiment, the gateway 130 can communicate with the Internet 150 wirelessly, through wireless communications with a satellite 180 and/or a cellular tower 190. The user of such a wireless interface between the gateway 130 and the internet 150 can be a factor of available internet connectivity and desired mobility of the sensor network 140, among other considerations.

Figure 2:
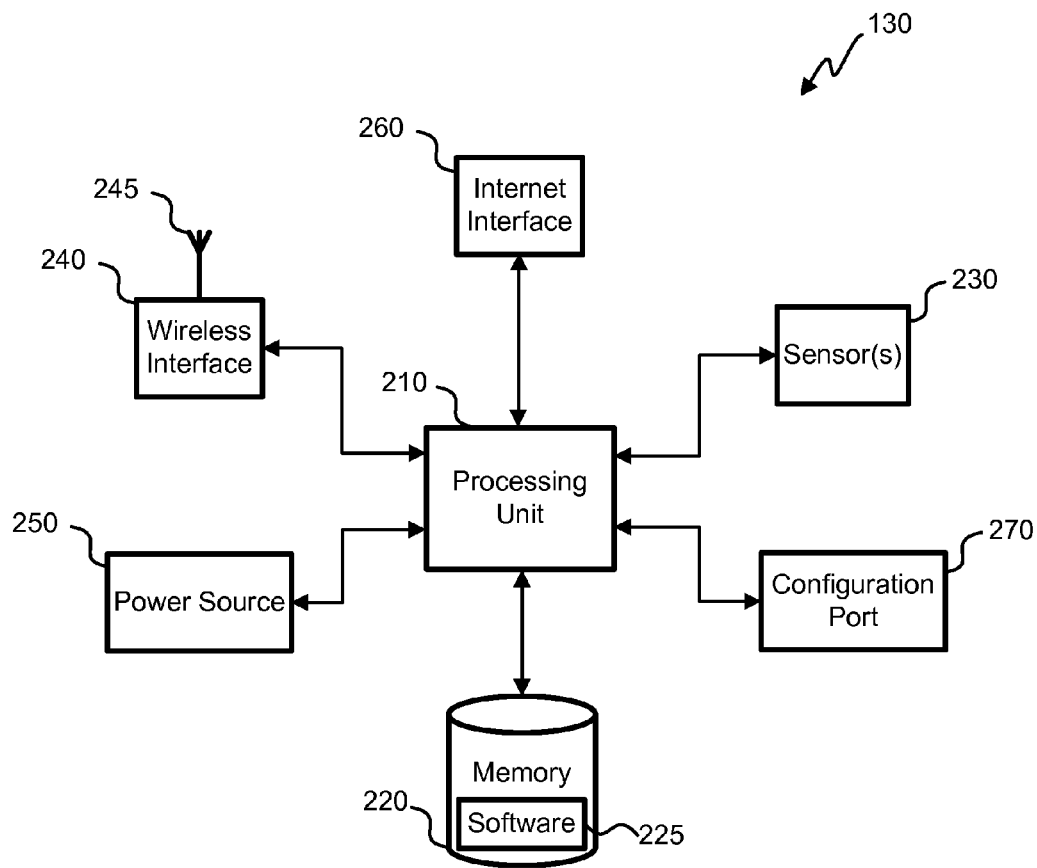
FIG. 2 is a block diagram of an embodiment of a gateway device.

FIG. 2 is a block diagram of an embodiment of a gateway device 130. This block diagram, as with other figures shown herein, is provided as an example only, and is not limiting. The gateway device 130 can be configured in alternate ways by, for example, including a global positioning system (GPS) unit and/or other components not shown in FIG. 2.

A processing unit 210 lies and the heart of the gateway device 130. The processing unit 210 can be comprised of one or more processors, microprocessors, and/or specialized integrated circuits. The processing unit 210 can gather information from the other components of the gateway device 130 and process the information in accordance with software 225 disposed in memory 220. Depending on desired functionality of the gateway device 130 and the capabilities of the processing unit 210, the software 225 can include an operating system with one or more executable programs. Alternatively, the software can include lower-level instructions, such as firmware and/or microcode, for the processing unit 210 to execute.

The power source 250 supplies power to the components of the gateway device 130 and may provide additional information (e.g., battery charge, voltage levels, etc.) to the processing unit 210. For a mobile gateway device 130, the power source 250 can comprise one or more batteries. For a fixed gateway device 130, the power source can include a power converter, transformer, and/or voltage regulator.

The wireless interface 240 provides communication with WSDs 110. As indicated above, this communication can be effectuated using any of a variety of technologies, including radio frequency (RF) and/or optical communication technologies. Where RF technologies are used, the wireless interface can include an antenna 245.

The gateway device 130 can also include a configuration port 270, which can allow a device, such as a computer, to be connected to the gateway device 130 for the purposes of configuring the gateway device 130. The configuration port 270 can comprise universal serial bus (USB) connector, serial port, optical, or other connector to input information from an external device. Depending on the functionality of the gateway device 130 and/or WSDs 110, the configuration port 270 may be used to configure device information and reporting, sensor parameters, software, security, network parameters, power consumption, GPS parameters, file management, and more.

The Internet interface 260 can be any of a variety of interfaces, depending on desired functionality. As indicated in FIG. 1A, the gateway device 130 can have a wired connection with the Internet, in which case the Internet interface 260 can include an Ethernet or other wired interface. Additionally or alternatively, the gateway device 130 can have a wireless connection with the Internet, as indicated in FIG. 1B. In this case, the Internet interface can comprise one or more wireless radios, such as a dual-mode WAN radio enabling cellular and satellite communication.

The gateway device 130 further can include sensor(s) 230, enabling the gateway device to collect sensor information similar to the WSDs. This sensor information can include information relating to temperature, humidity, motion, light, battery charge, shock, and application-specific information (e.g. the state of a door—open or closed—on a cargo container). Depending on desired functionality, the processing unit 210 may collect, process, and/or record the sensor information, or the processing unit 210 simply may send unprocessed sensor information to the DMS 160 using the Internet interface 260.

Figure 3:
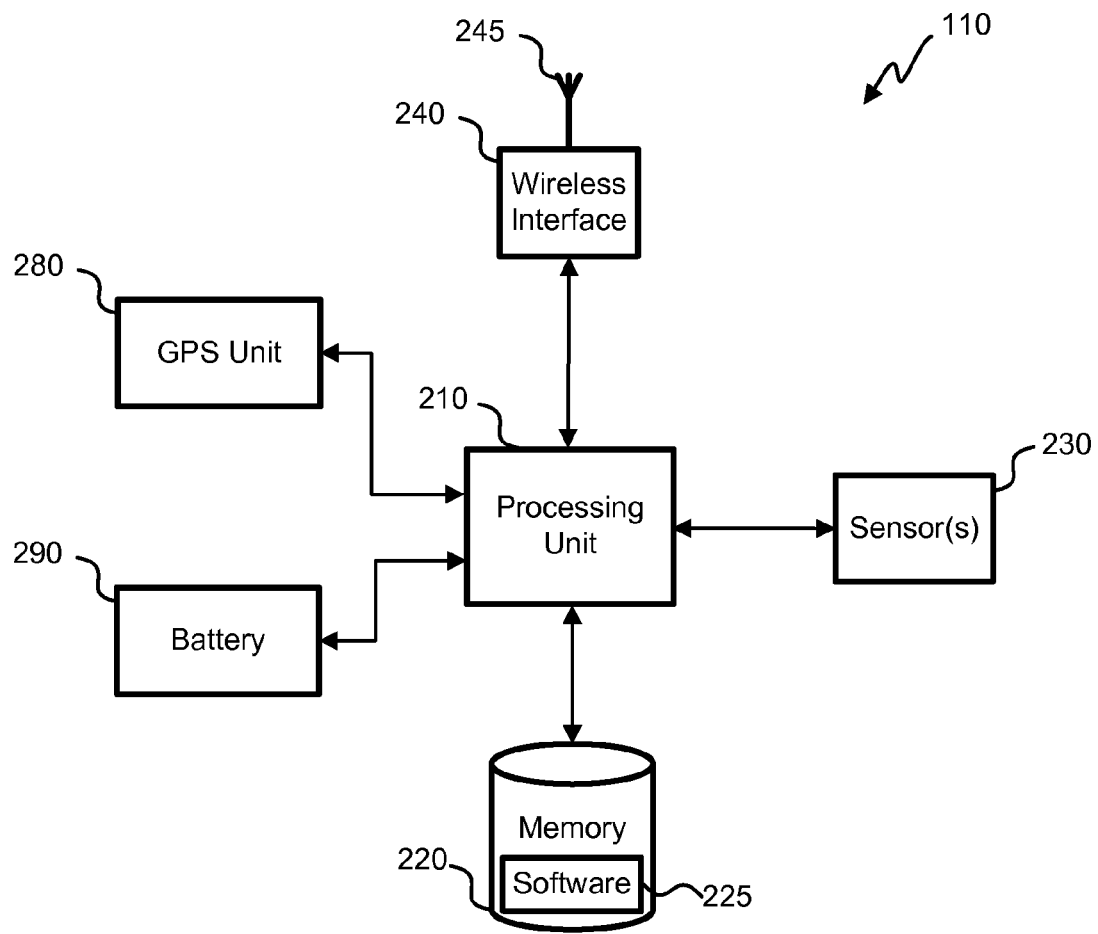
FIG. 3 is a block diagram of an embodiment of a wireless sensor device (WSD).

FIG. 3 is a block diagram of an embodiment of a WSD 110. This embodiment includes many components—such as the sensor(s) 230, processing unit 210, memory 220, and wireless interface 240—that are similar to the gateway device 130. Here, however, the components may be simpler than corresponding components of the gateway device 130, due to power and functionality considerations. For example, the processing unit 210 can comprise a microprocessor and the memory 220 and software 225 can comprise programmed logic of the microprocessor. It can also be noted that the WSD 110 and/or the gateway device can include an interface (not shown) to provide a user with information. Such an interface can comprise a liquid-crystal display (LCD), one or more light emitting diodes (LEDs), etc.

WSD 110 further includes a battery 290. Because the wireless network can provide lower-power consumption, a battery having a long shelf life—such as an alkaline-, silver-oxide-, or lithium-based battery—can provide for operability of the WSD 110 without the need to change batteries for several years. According to one embodiment, a WSD 110 uses up to 4 A-size 3.6 volt (V) batteries, each battery rated at approximately 3600 milliamp hours (mAh). Some embodiments of the WSD 110 have an operating power of under 2 milliwatts (mW); other embodiments of the WSD operate under 1 mW. Therefore, depending on the battery's shelf life and capacity, as well as the configuration of the WSD 110, the WSD 110 can operate for 10 years or more without the need to change the battery.

The WSD 110 can also include a GPS unit 280 to provide location information. Location information can be particularly useful where a sensor network 140 is spread over a large physical area. Moreover, the GPS unit 280 further can be used to sense motion of the WSD 110 by determining, by the GPS unit 280 and/or the processing unit 210 a change in location over time.

Figure 4:
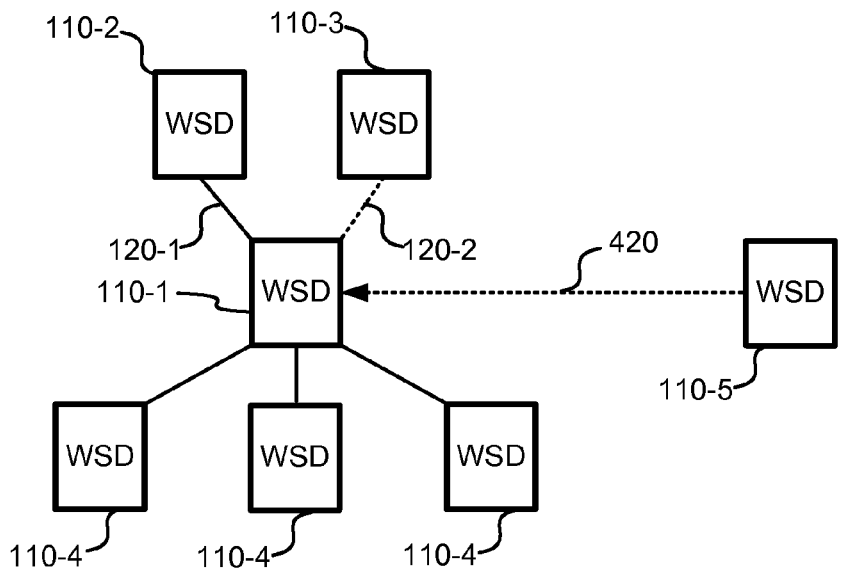
FIG. 4 is a diagram of a group of WSDs forming a portion of a wireless sensor network, according to one embodiment.

FIG. 4 is a diagram of a group of WSDs 110 forming a portion of a wireless sensor network 140 (or other wireless network), according to one embodiment. In this diagram, WSDs 110 are connected to the wireless sensor network 140 through the WSDs 110 located above them, such that WSDs 110-4 are connected to WSD 110-1, which is connected to WSDs 110-2 and 110-3 which are, in turn, connected with other WSDs 110 and/or gateway(s) 130 (not shown).

The relationship between WSDs 110 can be described as a "parent-child" relationship. A first WSD 110 through which a second WSD 110 is connected to the wireless sensor network 140 can be called the second WSD's "parent." Similarly, the second WSD 110 can be called the first WSD's "child." Thus, in FIG. 4, the WSD 110-1 is parent to the WSDs 110-4, and child to the WSDs 110-2, 110-3. More generally, a parent is an "upstream" node through which data from the WSD 110 (or any other "child" WSD 110) is relayed to get to the gateway 130. For WSDs 110 wirelessly connected directly with the gateway 130, the gateway 130 acts as a parent node. WSDs 110 can function as children and parents simultaneously, and depending on desired functionality of the wireless sensor network 140, a WSD 110 may have a maximum amount of children and/or a maximum amount of parents. Keeping the number of children and/or parents at or below a maximum amount can help ensure a more predictable power profile for the WSD 110.

WSDs can connect with the wireless sensor network 140 using beaconing and scanning techniques. For example, WSDs 110 connected with the wireless sensor network 140 can send out beacons, or packets of information with information to enable other WSDs 110 to join the wireless sensor network. The beacons can include information such as authentication data, a beacon packet number, a network identification number, and/or other information. Such information, such as the beacon packet number, can comprise a predetermined pattern or signal that indicates to a WSD 110 receiving the length of a beaconing sequence and/or a time at which the receiving WSD 110 can attempt to join the wireless sensor network 140. WSDs 110 connected with the wireless sensor network 140 can act as "servers" by transmitting beacons periodically. On the other hand WSDs 110 not connected with the wireless sensor network 140 can act as "clients" by periodically scanning for beacons transmitted by the servers. The scanning and beaconing periods of the clients and servers can be offset and/or adjusted in length to help ensure that, eventually, a client's scan will detect, or "capture," a server's beacon. More detailed information about scanning and beaconing processes, as well as subsequent joining processes, can be found in U.S. patent application Ser. No. 13/023,673, entitled "LOW POWER WIRELESS NETWORK FOR TRANSPORTATION AND LOGISTICS," and U.S. patent application Ser. No. 13/096,127, also entitled "LOW POWER WIRELESS NETWORK FOR TRANSPORTATION AND LOGISTICS," both of which are incorporated herein in their entirety.

After capturing a server's beacon, a client can attempt to join the wireless sensor network 140 by establishing a wireless connection 120 with the server. The joining process can occur through an exchange of data at a designated time after the beaconing and/or scanning process. The designated time may be indicated by the captured beacon. The joining process may fail due to a variety of reasons, such as a failure to authenticate, an incorrect network ID, radio frequency interference, contention (e.g., attempts by multiple clients to join at the same time), and more. However, if the joining process is successful, the client connects through the wireless sensor network 140 through the server, thereby becoming a child to the server; the server becoming the parent to the client.

To ensure the stability and integrity of the wireless sensor network 140, WSDs 110 may have multiple parents. For example, referring again to FIG. 4, the WSD 110-1 pictured has two parents: a primary parent 110-2 and a secondary, or backup, parent 110-3. (For purposes of clarity wireless connections 120 between the WSD 110-1 and parents 110-2, 110-3 are indicated differently: the WSD's connection with the primary parent 110-2 is indicated with a solid line 120-1, and the WSD's connection with the backup parent 110-3 is indicated with a dotted line 120-2.) Among other purposes, this multi-parent configuration can increase stability of the wireless sensor network 140 by allowing the WSD 110-1 to maintain a connection with the wireless sensor network 140 through the wireless connection 120-2 with the backup parent 110-3 in case the wireless connection 120-1 with the primary parent 110-2 is lost. Otherwise, most or all communication between the node 110-1 and the wireless sensor network can be relayed through the primary parent 110-2. This redundancy helps provide improved recovery of potentially broken wireless connections 120.

One technique of improving redundancy in the wireless sensor network 140 is to give priority to creating connections that establish a backup parent relationship with a joining WSD 110-5. For example, if WSD 110-1 receives a request from a joining WSD 110-5 to become the joining WSD's backup parent, it can prioritize this request over other requests the WSD 110-1 may have received to become a primary parent. Of course, if the WSD 110-1 is able to do so, it can accommodate all the requests. However, because the WSD 110-1 may be configured to have a limited amount of children WSDs 110-4, the joining WSD 110-5 requesting a backup parent may be prioritized over other requests for the limited amount of children slots. Moreover, the WSD 110-1 can even evict, or disconnect with, a current child to which the WSD 110-1 is the primary parent in order to accommodate the request from the joining WSD 110-5 to become the backup parent.

Figure 5:
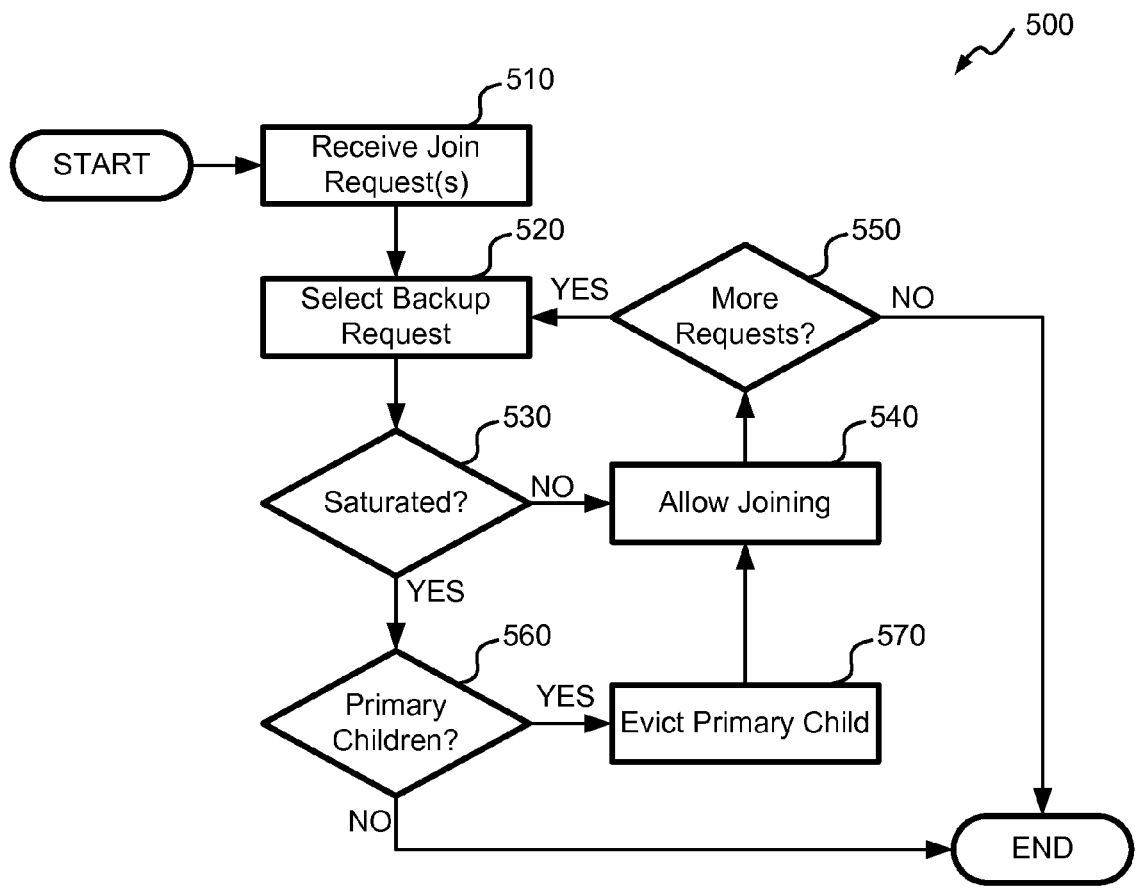
FIG. 5 is a flow diagram of an embodiment of a method for prioritizing backup parent joining, according to one embodiment.

FIG. 5 illustrates a method 500 a WSD 110, such as the WSD 110-1 of FIG. 4, can follow to prioritize backup parent joining, according to one embodiment. As with other figures provided herein, the method 500 is an example only and is not limiting. For example, other embodiments may have differences: blocks can be added, combined, split, and/or rearranged without straying from the spirit or scope of the disclosed method 500.

The method 500 can begin at block 510, where join request(s) are received. As discussed above, multiple requests to join may be received at approximately the same by a single WSD 110-1. At block 520, the WSD 110-1 selects a backup request, prioritizing a request to become a backup parent over other requests. Where multiple backup requests are received, other factors can be considered to prioritize among the backup requests.

At block 530, the WSD 110-1 determines whether it is saturated with wireless connections 120 to children WSDs 110-4. In other words, the WSD 110-1 determines whether it already has a maximum amount of children WSDs 110-4. If not, the WSD 110-1 allows joining 540 and determines if there are any more join requests at block 550. If there are more join requests, the process at block 520 begins with the next request. If there are no more join requests, the method 500 ends.

If, on the other hand, the WSD 110-1 is saturated with a maximum amount of children WSDs 110-4, then the method 500 follows a different path. First, at block 560, the WSD 110-1 determines if it has any primary children (e.g., children for which the WSD 110-1 is serving as a primary parent). If not, the method 500 can end at that point. Or, alternatively, the method 500 may consider other factors that could prioritize the join request over an existing connection with a child 110-4. On the other hand, if there is at least one connection with a primary child 110-4, the WSD 110-1 can evict the primary child at block 570, and allow joining (block 540) and field further requests (block 550) as discussed above. There is little concern for the evicted child 110-4, because it may have a backup parent of its own, and will likely be able to find a primary parent (such as one of the other children 110-4 of the WSD 110-1, or the newly joined WSD 110-5).

Figure 6:
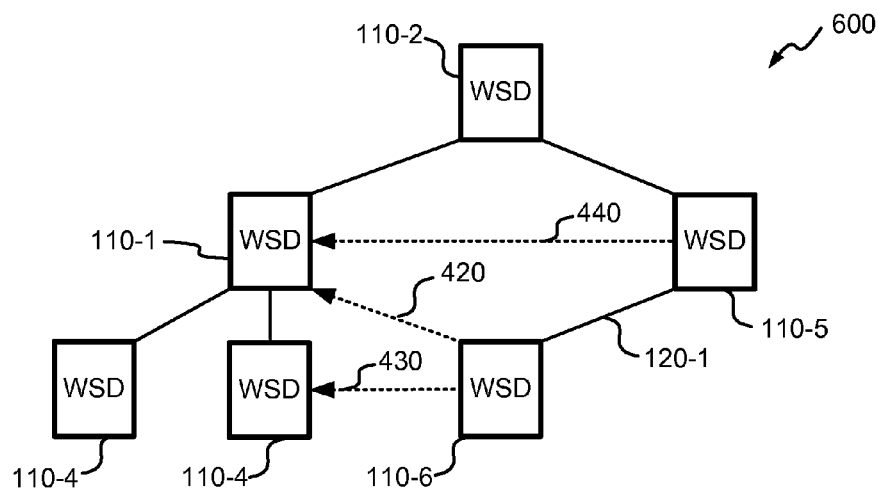
FIG. 6 is a diagram of a group of WSDs forming a portion of a wireless sensor network, according to one embodiment.

Another technique of improving redundancy in a wireless sensor network 140 is to prioritize backup connection with peers (in terms of "cost," as explained in more detail below), as opposed to WSDs 110 with the same cost as the parent. FIG. 6 is diagram 600 of a group of WSDs 110 forming a portion of a wireless sensor network 140, which helps to illustrate this type of prioritization. Again, this diagram is an example and is not limiting.

In the diagram 600, WSD 110-1 acts as a primary parent to children WSDs 110-4. At the same time another WSD 110-5 which has a parent 110-2 in common with the WSD 110-1, acts as a primary parent to the child 110-6. Because WSDs 110-1 and 110-5 have a common parent (or, more broadly, are an equal number of hops, or wireless connections 120, away from the gateway 130 (not shown)), they are peers. In this configuration, the WSD 110-6 can prioritize sending a backup request 430 to its peer WSD 110-4 over sending a backup request 420 to WSD 110-1, even though WSD 110-1 is closer to the gateway 130 (not shown). This can help increase redundancy of the wireless sensor network 140 by freeing up the WSD 110-1 to accept a request 440 become the backup parent to its peer WSD 110-5. Thus, in general, WSDs 110 can prioritize backup requests of peers over requests of WSDs 110 that are closer (e.g., fewer hops) to the gateway 130.

This principle also can be explained in terms of "cost." Here, the cost of a WSD 110 can include a number of hops (e.g., wireless connections) to a gateway 130, among other things such as type of communications of a gateway (satellite 180, cellular tower 190, etc.) and other factors that may impact a preference corresponding to connecting with the WSD 110. For simplicity, examples included herein will base cost solely on number of hops from the gateway 130 (although, in practice, cost can include more factors, as mentioned). Thus, for example, a WSD 110 that is 10 hops away from the gateway 130 may have a cost of 10, and a WSD 110 that is 12 hops away from the gateway 130 may have a cost of 12. Because the amount of hops is determined though a WSD's primary parent, the WSD 110 will always have a cost of 1 greater than the cost of the primary parent. Peer WSDs (which may or may not have the same parent) therefore have equal cost. In other words, they have a cost difference of 0. In joining, and/or during other communications, a value indicative of the cost and/or the cost itself is send between WSDs 110 to help allow the WSD 110 receiving the value to determine a preference (e.g., a priority for joining) corresponding to the WSD 110 that sent the value.

Cost can be used to determine priority for backup parenting in wireless sensor networks 140. Referring again to FIG. 6, if WSD 110-6 establishes WSD 110-1 as a backup parent, the cost difference of the wireless connection 420 is −1. That is, the cost of the backup parent 110-1 is one less than the cost of the child 110-6. The child 110-6 can prioritize a connection with WSD 110-4, such that, if given the opportunity, the child 110-6 will establish a connection 430 with WSD 110-4 and drop the connection 420 with WSD 110-1, making WSD 110-4 its new backup parent. Thus, the WSD 110-6 prioritizes backup connections with a cost difference of 0 over backup connections with a cost difference of −1. Depending on the functionality of the system, to ensure good redundancy, WSDs 110 may be limited to establishing backup connections that would have a cost difference of either −1 or 0. (It will be understood that establishing backup connections what would have a cost difference of 1 or greater may create undesirable "loops" that could cause a note to be a descendent of itself.)

Figure 7:
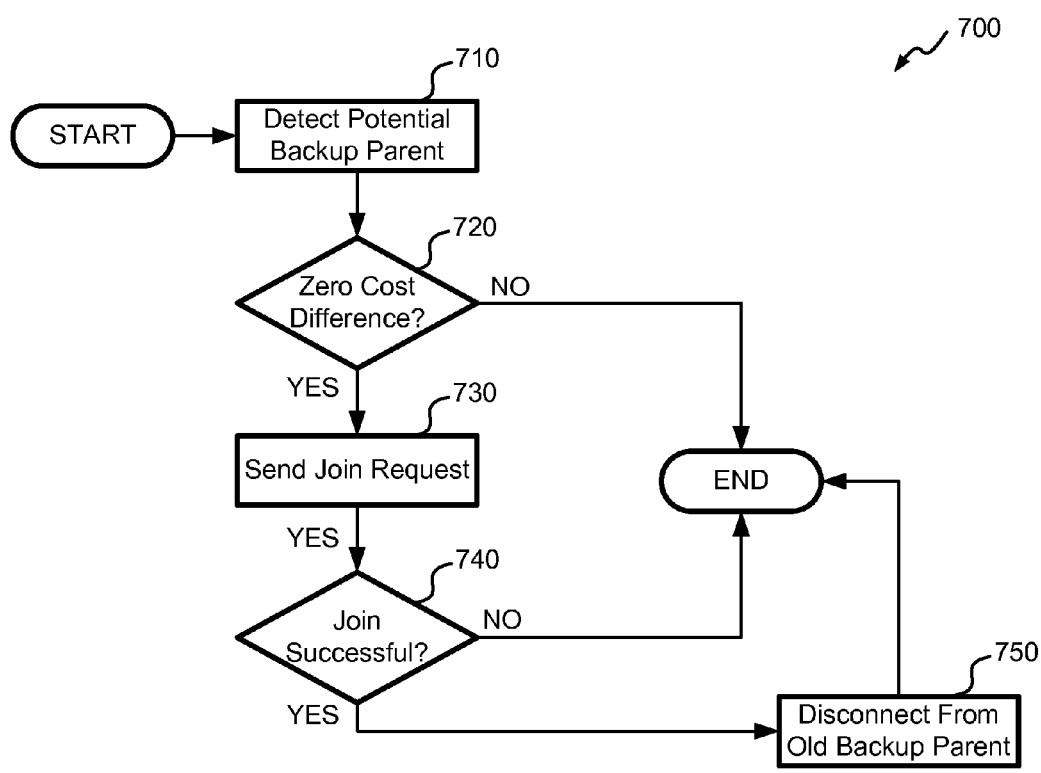
FIG. 7 is a flow diagram of an embodiment of another method for prioritizing backup parent joining, according to one embodiment.

FIG. 7 is a block diagram illustrating a method 700 of prioritization of backup connections that can be utilized by a WSD 110 having a current backup connection with a cost difference of −1. Depending on the beaconing and/or joining processes of the wireless sensor network 1140, this method 700 can be executed by a WSD 110 during a beaconing process, a subsequent data exchange, and/or a joining process.

For example, at block 710, the WSD 110 can detect a potential backup parent through normal the scanning and beaconing processes such as those discussed above. At block 720, the WSD can determine whether that cost difference of a connection with the potential backup parent would be 0. If not the process ends. If the cost difference of the potential connection would be 0, then the WSD can send a join request 730 to attempt to join with the potential backup parent. At block 740, the WSD 110 can determine if the join was successful, and if so, proceed to disconnect from the old backup parent, at block 750, to establish the new backup parent.

Figure 8:
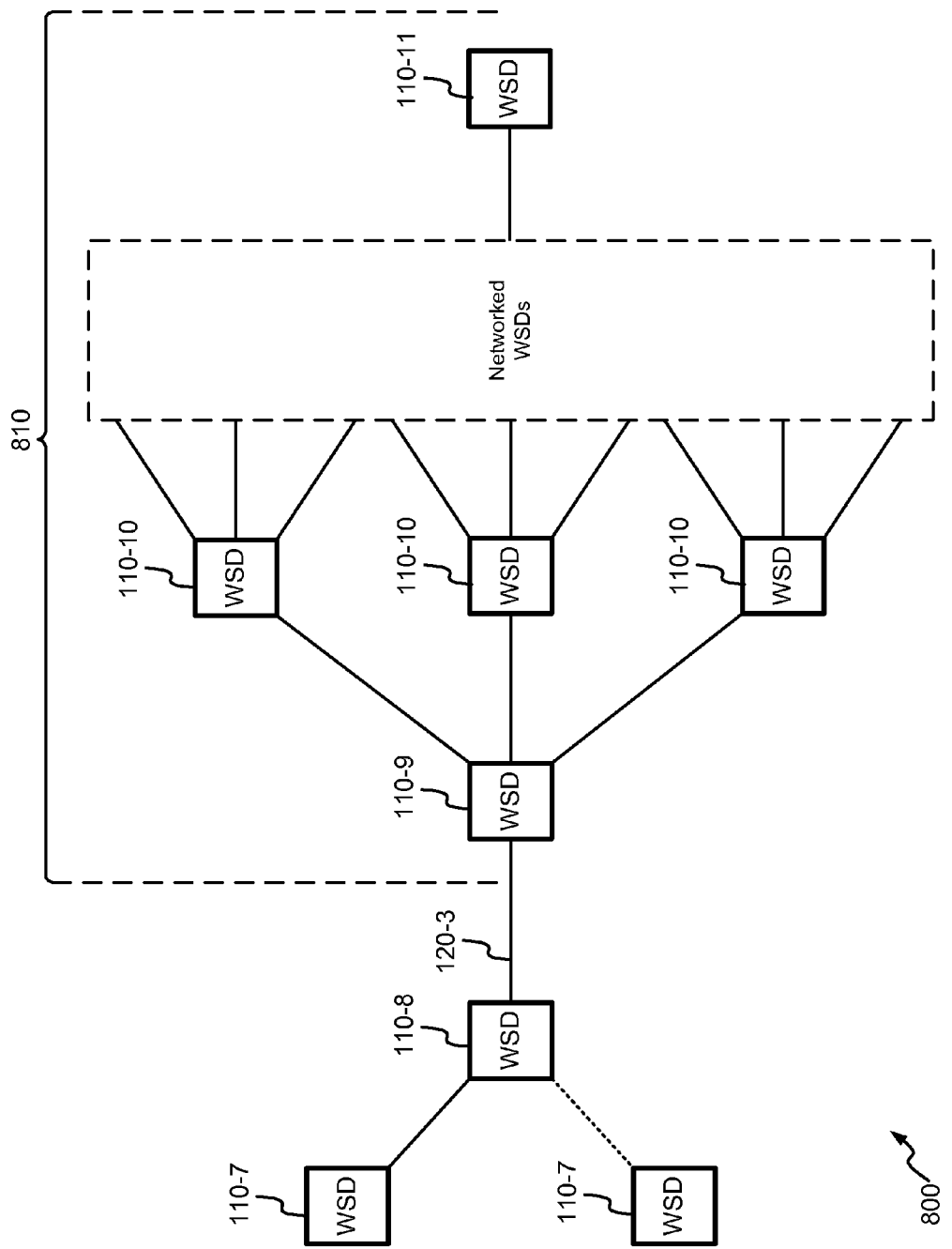
FIG. 8 is another simplified diagram of a group of WSDs forming a portion of a wireless sensor network.

As discussed above, the redundancy created by backup parenting can improve the integrity of the wireless connection network 140. FIG. 8 is a diagram 800 of a group of WSDs 110 forming a portion of a wireless sensor network 140, which helps illustrate the importance of maintaining wireless connections 120 in the wireless sensor network. For example, a portion of the wireless sensor network 140 may comprise a large branch 810, with many WSDs 110-9, 110-10, 110-11 communicating with the rest of the wireless sensor network 140 via a single wireless connection 120-3 supported by single WSD 110-8 (which may be connected to parents 110-7 as shown). (To reduce clutter, diagram 800 includes box labeled "Networked WSDs as a substitute for any number of WSDs 110 that also may be included in the branch 810.)

Figure 9:
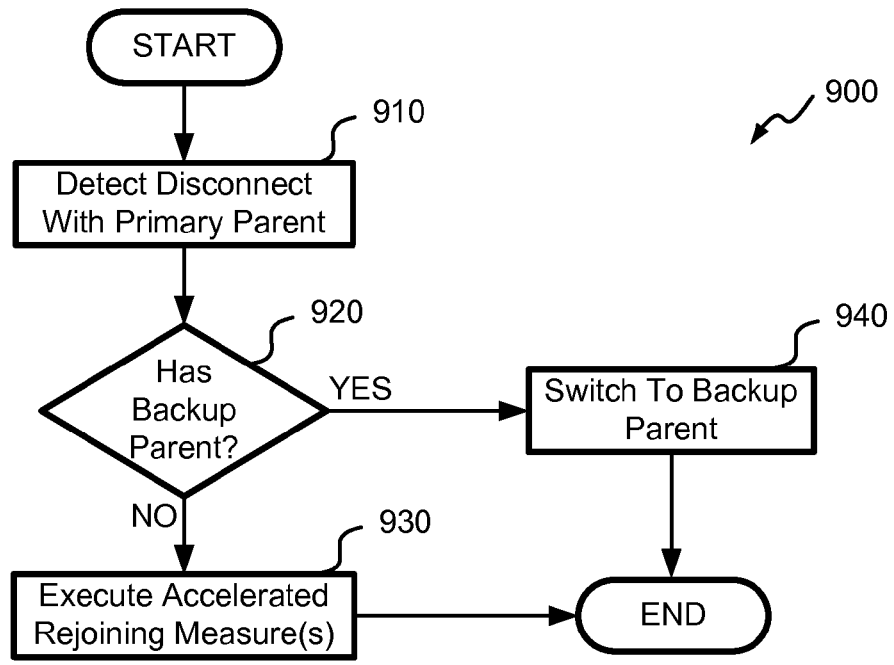
FIG. 9 is a block diagram illustrating a general method that WSDs of a wireless sensor network to help prevent a group of WSDs from disassociating and help accelerate rejoining

Such a configuration can be problematic. Among other problems, if the wireless connection 120-3 is dropped, the WSD 110-9 may indicate to its children 110-10 that the wireless connection 120-3 was dropped (and the children would convey the message to the rest of the branch 810). For example, the WSD 110-9 may indicate the wireless connection 120-3 was dropped by indicating that its cost is now infinite (or above a certain threshold). After determining the wireless connection 120-3 is dropped, all the WSDs 110-9, 110-10, 110-11 in the branch can quickly drop all of their connections and attempt to rejoin to the wireless sensor network 140 by establishing new connections. If the wireless connection 120-3 is re-established, the branch 810 may be established eventually. However, this can take a relatively large amount of time because all the WSDs 110-9, 110-10, 110-11 typically would have to establish all new links using beaconing, scanning, and joining techniques such as those discussed above. A WSD 110-11 at the end of the branch 810 therefore may rarely join the wireless sensor network 140 if drops in the wireless connection 120-3 (and/or other single connection points) reoccur at a frequency that does not have sufficient time between drops to allow the branch 810 to reconstruct itself This problem can be overcome by executing one or more measures to accelerate rejoining and/or prevent the branch 810 from disassociating. FIG. 9 is a block diagram illustrating a general method 900 that WSDs 110 of the wireless sensor network 140 can execute to this end, according to one embodiment. For example, the method 900 can start by detecting a disconnect or drop in a wireless connection 120 with a primary parent. The WSD 110 can then determine if it has a backup parent at block 920, and if so, switch to the backup parent at block 940. If the WSD 110 has no backup parent, it can then execute one or more accelerated rejoining measure(s) discussed below.

Figure 10:
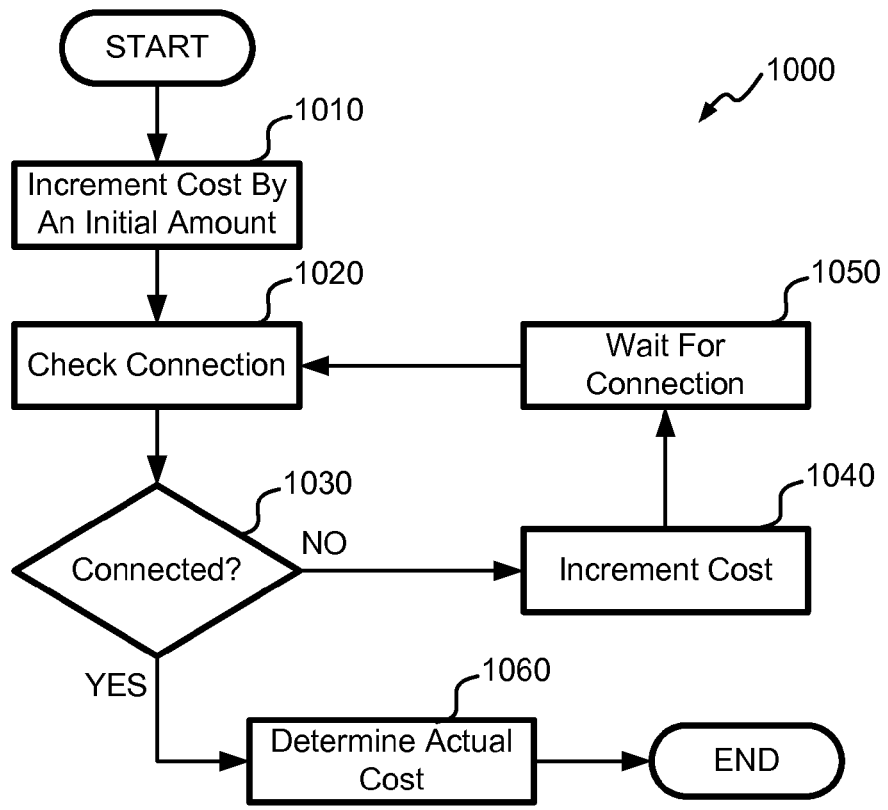
FIG. 10 is a block diagram of an embodiment of a method that helps preserve the structure of a group of WSDs that becomes disconnected with the rest of a wireless sensor network.

FIG. 10 illustrates an embodiment of a method 1000 that helps preserve the structure of a group of WSDs (such as the branch 810 of FIG. 8) if it becomes disconnected with the rest of a wireless sensor network 140. This can be achieved by having a WSD 110 at the point of failure "hide" the fact that the group has been disconnected. For example, after a connection has been dropped, the WSD 110 can increment its cost (e.g. decrease a preference corresponding to connecting with the WSD 110) by an initial amount, at block 1010, rather than simply increase its cost to infinity.

At block 1020, the WSD 110 can check to determine whether a new connection has been established (including re-establishing the dropped connection). At block 1030, if the WSD 110 has determined that a connection has been established, the process moves to block 1060, where the actual cost is determined, based on the new connection. Otherwise, if no connection has been established, the cost is incremented at block 1040, and at block 1050, the WSD waits for a certain period of time to allow for a connection to be established before returning to block 1020.

The initial increment in cost amount at block 1010 can be different than subsequent increments at block 1040. For example, and initial increment in cost can be 5, while subsequent increments can be 1. Because WSDs 110 generally will not join other WSDs 110 with higher costs, this larger initial increment in cost can help allow the WSD 110 to quickly rejoin the wireless sensor network 140 by effectively increasing the number of other WSDs it can join with. Subsequent, smaller increments can delay the breakup of a group of WSDs long enough to allow the WSD 110 to establish a new wireless connection 120 with the wireless sensor network 140.

The method 1000 of FIG. 10 may not delay the breakup of a group of WSD indefinitely. The WSDs 110 may be configured to drop a connection that has a certain maximum finite cost. For example, WSDs 110 may be configured to drop a connection that reaches a cost of 100 or more. This means that, if the group of WSDs is not reconnected within a certain amount of time, WSDs 110 with the highest costs will drop of as the costs are incremented according to the method 1000. In many instances, where a connection is not reestablished, this breakup of a group of WSDs through a method similar to method 1000 of FIG. 10 may be as short as a similar breakup where the dropped connection cost is set to infinity.

Figure 11:
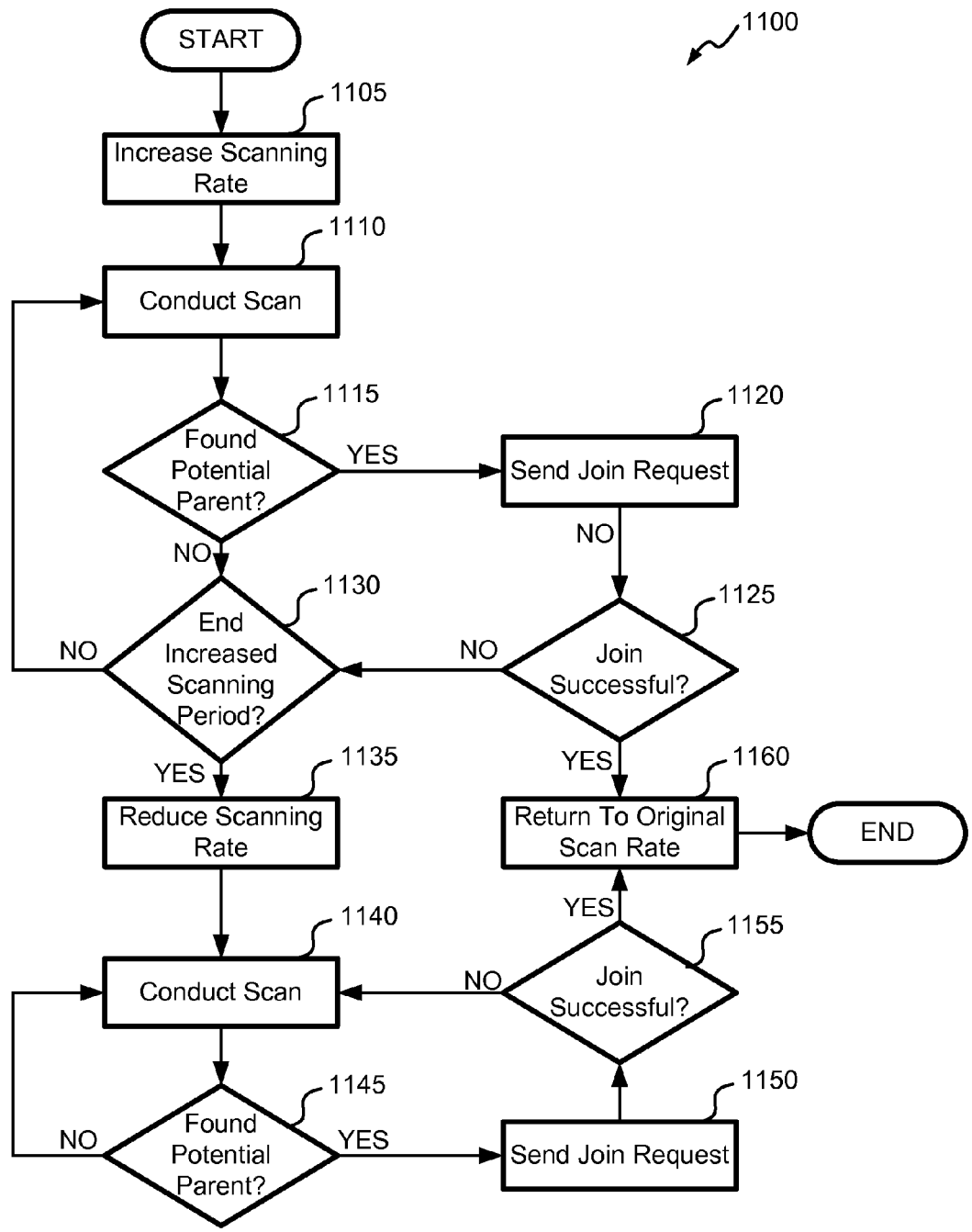
FIG. 11 is a block diagram of a accelerated rejoining measure, according to one embodiment.

FIG. 11 is a block diagram 1100 of another accelerated rejoining measure, according to one embodiment. According to this embodiment, a WSD 110 can utilize different scanning rates depending on whether the WSD 110 is connected with wireless sensor network 140, recently disconnected with the wireless sensor network 140, or disconnected with the wireless sensor network 140 for a certain period of time.

As discussed above, WSDs 110 can periodically execute scanning sequences, even when connected with the wireless sensor network 140, to help optimize the network and establish redundant (e.g., backup) connections. The periodicity, or scanning rate, at which these scans are conducted can vary depending on desired functionality. For example, according to one embodiment, scans are conducted every 2.5 seconds.

At block 1105, after a wireless connection 120 is dropped, the WSD 110 can increase its scanning rate. In other words, the WSD 110 can increase the frequency at which it scans for beacons from the wireless sensor network 140, thereby increasing the likelihood that it can capture a beacon sent by another WSD 110 on the wireless sensor network 140.

The increase in the scanning rate can vary by desired functionality. The increase simply can be a multiplier of the normal rate such that, for example, the increased scanning rate is 2, 3, 4, 5, 6, 7, or 8 times faster than the scanning rate of the WSD 110 when the WSD 110 is connected with the wireless sensor network 140. Additionally or alternatively, the increase may include any rate within a range of desired scanning rates. Moreover, the rate at which the scanning rate increases may vary depending on numerous factors such as time of day, type of network, measured battery life, etc.

At block 1110, the WSD 110 conducts a scan to capture any beacons that may be sent by other WSDs 110 that are connected with the wireless sensor network 140. At block 1115, if a beacon is captured the WSD 110 can determine whether a potential parent has been found. The successful capture of a beacon may not necessarily mean that it was sent by a potential parent. For example, after a beacon is captured, the WSD 110 may exchange data with the device that sent the beacon that may lead the WSD 110 to conclude the sending device may not be a potential parent. Factors that can impact this conclusion include failure to provide adequate authentication, providing an incorrect network identification, and more.

At block 1120, the WSD 110 sends a join request. And at block 1125, if that join is successful, the WSD 110 can return to the original scan rate it used when connected with the wireless sensor network 140. On the other hand, if the join is not successful, the process returns to block 1130 where it is determined whether the increased scanning period has ended.

The period in which the WSD 110 conducts increased scans can vary, just as the scanning rate does. This period of time can vary depending on desired functionality. According to some embodiments, this period can range from half a minute or less to several minutes or more. Additionally, the length of this period can vary, depending on factors similar to those used to decide a scanning rate. If the WSD 110 determines that the period which the WSD 110 conducts increased scans has not ended, then the process moves to block 1110, where the WSD 110 continues to scan at the increased scanning rate.

However, if the period in which the WSD 110 conducts increased scans has ended, then at block 1135 the scanning rate is reduced. This reduced scanning rate may be higher, lower, or equal to the original scanning rate used when the WSD 110 is connected with wireless sensor network 140. However, because the WSD 110 is disconnected from the wireless sensor network 140, it has few functions to perform besides scanning and may therefore scan at a rate higher than the original scanning rate while using roughly the same amount of battery life as the WSD 110 would if connected with the wireless sensor network 140.

The scanning process at the reduced scanning rate echoes the process at the increased scanning rate. Namely, at block 1140, the WSD 110 conducts a scan, where it proceeds to block 1145 to determine if it has found a potential parent. If not, the scanning continues at block 1140, the reduced rate. If so, a join request is sent at block 1150. If the join is not successful, scanning continues at block 1140. But if the joining is successful, the WSD 110 can return to the original scanning rate at block 1160, and the method 1100 ends.

The length of the method can vary, depending on if and when the WSD 110 joins with the wireless sensor network 140. For example, a WSD 110 can increase a scanning rate by 4 times the original scanning rate for two minutes after a wireless connection drops. Thereafter, the scanning rate may be reduced to 2 times the original scanning rate until the WSD 110 is successful at rejoining the wireless sensor network 140.

It can be noted that the WSD 110 can execute power-saving techniques differently when utilizing different scanning rates. For example, when a join request is unsuccessful, the WSD 110 can omit subsequent scans to compensate for the power used in the join attempt. The number of subsequent scans omitted can vary, depending on the scanning rate executed by the WSD 110. For example, the WSD 110 may omit 10 subsequent scans if a join request is unsuccessful while the WSD 110 is scanning at the original scanning rate. However, the WSD 110 may omit only 5 subsequent scans if a join request is unsuccessful while the WSD 110 is scanning at the increased scanning rate, to help ensure the odds of capturing a beacon are increased. Yet another number of scans may be omitted if the join request is unsuccessful while the WSD 110 is scanning at the reduced scanning rate.

Figures 12, 13:
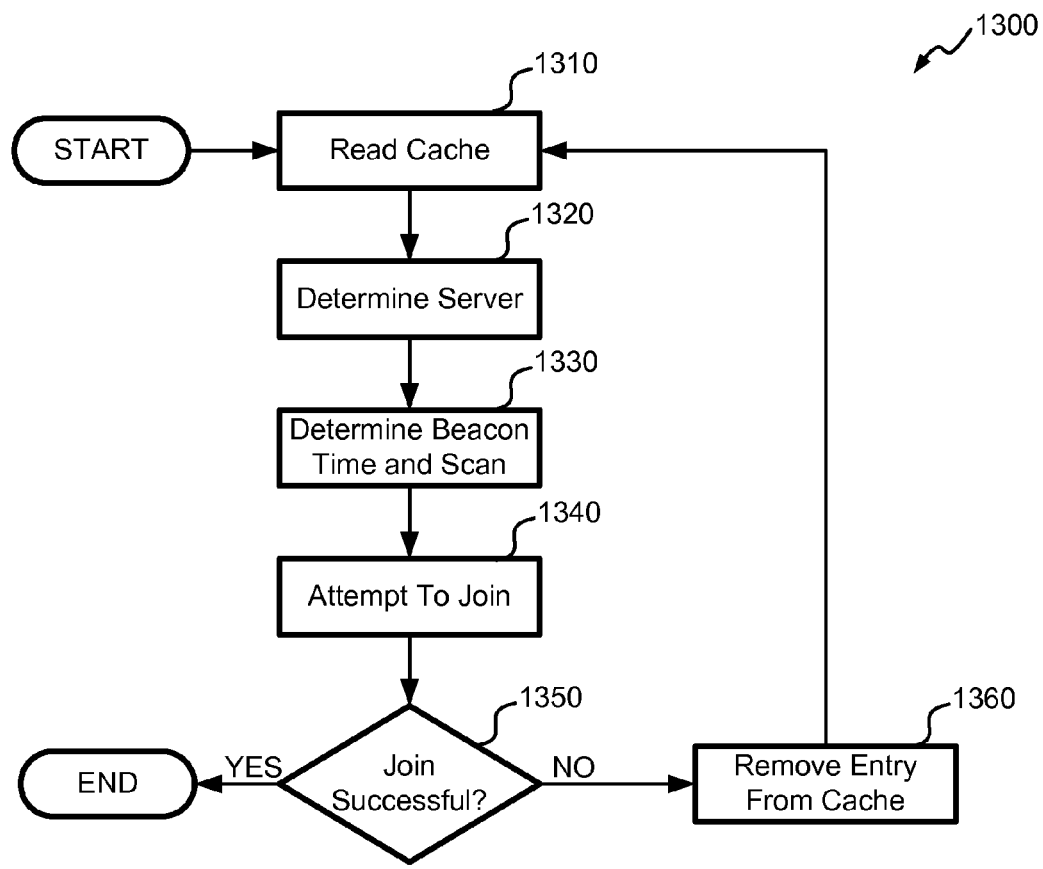
FIG. 12 is a simplified illustration of a cache that a WSD can keep to help assist in an accelerated rejoining method.
FIG. 13 is a block diagram of a accelerated rejoining measure that utilizes a cache, according to one embodiment.

FIGS. 12-13 relate to yet another accelerated rejoining measure that a WSD 110 can take when a wireless connection 120 is dropped. Because a WSD 110 conducts scans when both on and off the wireless sensor network 140, it can keep a cache 1200, shown in FIG. 12, to store information relating to any number of captured beacons. The WSD 110 may not act upon receiving these beacons due to various reasons, such as the potential connection would be at a higher cost than a current connection. The WSD 110 can later use the information in this cache to quick rejoin the wireless sensor network 140 if a wireless connection 120 is dropped.

The cache can include a variety of information and may vary in size. Information can include a server identification (ID), timestamp, channel, and cost, among other things. Values provided in the cache 1200 are provided as an example, and are not limiting. Moreover the format and content can vary, depending on implementation. Additionally, the amount of entries can vary depending on desired functionality. For example, the cache may include entries for the last 10, 20, 30, 50, or 100 beacons captured. Alternatively, the cache may include entries for the beacons captured during a certain time period, such as the last minute, hour, day, etc.

FIG. 13 is a flow diagram illustrating an embodiment of a method 1300 that can be executed by a WSD 110 to accelerate rejoining to a wireless sensor network 140 by utilizing the cache 1200. At block 1310, the WSD 110 reads the cache 1200, and at block 1320, the WSD determines a server with which the WSD 110 will attempt to establish a wireless connection 120.

The server can be determined in a variety of ways. For example, the WSD 110 can prioritize the server from which a beacon was captured most recently. Alternatively, the WSD 110 may prioritize the server having the lowest cost. Other factors also may be considered, and the WSD 110 can use multiple factors, which may be weighed differently, in determining a server with which the WSD 110 will attempt to establish a wireless connection. Additionally or alternatively, the WSD 110 can update the priority of the entries in the cache 1200 beforehand such that a preferred server is at a known location (e.g., the top of the list).

At block 1330, the WSD 110 can determine a predicted time at which the preferred server will send a beacon and scan during that time. Because the frequency at which the server sends beacons is known to all WSDs 110, and because the cache can include a timestamp corresponding to the time at which a beacon from the server was captured, the WSD 110 can determine the next time at which the server will send a beacon. This is true for WSDs 110 operating on multiple frequencies as well, because beacons may follow a known pseudo-random schedule to transmit beacons at known times on known RF channels.

The WSD 110 additionally can take precautionary measures to compensate for drift in the timing clocks between the WSD 110 and the server. For example, because the clocks of the WSD 110 and the server may drift apart overt time, the WSD 110 can attempt to capture a beacon at the middle of the server's beaconing sequence. Because the beaconing sequence can be vastly larger than the amount of drift between the clocks of the WSD 110 and the server, this can help ensure that the WSD 110 will successfully capture a beacon from the server.

After capturing a beacon, the WSD 110 will attempt to join the server at block 1340, and at block 1350, the WSD 110 will determine if the join was successful. If so, the method 1300 will end. Otherwise, the WSD 110 can remove the entry from cache 1200, at block 1360, and retry the process using another entry from the cache 1200.

Although embodiments herein frequently are disclosed in the context of sensor networks 140, they are not limited to sensor networks, nor are they limited to transportation or logistical applications. Methods and devices disclosed herein can apply to wireless networks communicating information other than sensor information, such as identification, time, security, and/or location information. Indeed, any number of wireless networks can utilize the features disclosed herein for lower power consumption, predictable and consistent power consumption, and other benefits. Along these lines, the WSDs 110 disclosed herein are not limiting. Network devices utilizing the features disclosed herein, for example, may not gather or transmit sensor data.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-readable instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the disclosed systems, methods, and devices have been described in detail herein, it is to be understood that the inventive concepts may be otherwise variously embodied and employed, and that the appended claims are intended to be construed to include such variations, except as limited by the prior art.

What is claimed is:

1. A network device for communicating with a wireless sensor network, the network device comprising:
   a battery;
   a wireless interface; and
   a processing unit coupled with the battery and the wireless interface, wherein the processing unit is configured to cause the network device to:
   periodically scan for beacons at a first scanning rate when the network device is associated with the wireless sensor network, wherein scanning for beacons comprises operating in a mode to detect a predetermined pattern using the wireless interface;
   determine that the network device no longer is associated with the wireless sensor network;
   periodically scan for beacons at a second scanning rate for a certain period of time after the determining the network device no longer is associated with the wireless sensor network, wherein the second scanning rate is higher than the first scanning rate; and
   periodically scan for beacons at a third scanning rate if, after the certain period of time, the network device is not associated with the wireless sensor network.

2. The network device for communicating with the wireless sensor network recited in claim 1, wherein the third scanning rate is different than the first scanning rate.

3. The network device for communicating with the wireless sensor network recited in claim 2, wherein the third scanning rate is higher than the first scanning rate.

4. The network device for communicating with the wireless sensor network recited in claim 1, further including a memory, wherein the processing unit is configured to cause the network device to store information regarding at least one other network device in the memory.

5. The network device for communicating with the wireless sensor network recited in claim 4, wherein:
   the information regarding the at least one other network devices includes a timestamp; and
   the processing unit is configured to cause the network device to scan for beacons at a time based, at least in part, on the timestamp.

6. The network device for communicating with the wireless sensor network recited in claim 4, wherein the processing unit is configured to cause the network device to scan for beacons on a plurality of radio frequency (RF) channels.

7. The network device for communicating with the wireless sensor network recited in claim 1, wherein the processing unit is configured to cause the network device to send a value, using the wireless interface, indicative of a preference corresponding to connecting with the network device.

8. The network device for communicating with the wireless sensor network recited in claim 7, wherein:
the value comprises a first value; and
the processing unit is configured to cause the network device to send a second value, using the wireless interface, after the determining the network device no longer is associated with the wireless sensor network, wherein the second value is indicative of a decreased preference corresponding to connecting with the network device.

9. The network device for communicating with the wireless sensor network recited in claim 8, wherein the second value is not indicative of the network device being no longer associated with the wireless sensor network.

10. The network device for communicating with the wireless sensor network recited in claim 9, wherein the processing unit is configured to cause the network device to:
determine the network device has not been associated with the wireless sensor network for a certain length of time; and
send a third value, using the wireless interface, wherein the third value is indicative of the network device being no longer associated with the wireless sensor network.

11. The network device for communicating with the wireless sensor network recited in claim 1, further comprising at least one sensor communicatively coupled with the processing unit.

12. A method of communication in a low-power wireless network, the method comprising:
periodically scanning for beacons at a first scanning rate when a network device is associated with the low-power wireless network, wherein scanning for beacons comprises operating the network device in a mode to detect a predetermined pattern sent from the low-power wireless network;
determining that the network device no longer is associated with the low-power wireless network;
periodically scanning for beacons at a second scanning rate for a certain period of time after the determining the network device no longer is associated with the low-power wireless network, wherein the second scanning rate is higher than the first scanning rate; and
periodically scanning for beacons at a third scanning rate if, after the certain period of time, the network device is not associated with the low-power wireless network.

13. The method of communication in a low-power wireless network recited in claim 12, wherein the third scanning rate is different than the first scanning rate.

14. The method of communication in a low-power wireless network recited in claim 12, further comprising storing information regarding at least one other network device.

15. The method of communication in a low-power wireless network recited in claim 14, wherein the information regarding the at least one other network devices includes a timestamp, the method further comprising scanning for beacons at a time based, at least in part, on the timestamp.

16. The method of communication in a low-power wireless network recited in claim 12, wherein scanning for beacons includes scanning a plurality of radio frequency (RF) channels.

17. The method of communication in a low-power wireless network recited in claim 12, further including sending a value indicative of a preference corresponding to connecting with the network device.

18. The method of communication in a low-power wireless network recited in claim 17, wherein:
the value comprises a first value; and
the method further comprises sending a second value after the determining the network device no longer is associated with the low-power wireless network, wherein the second value is indicative of a decreased preference corresponding to connecting with the network device.

19. The method of communication in a low-power wireless network recited in claim 18, wherein the second value is not indicative of the network device being no longer associated with the low-power wireless network.

20. The method of communication in a low-power wireless network recited in claim 19, further comprising:
determining the network device has not been associated with the low-power wireless network for a certain length of time, and
sending a third value, wherein the third value is indicative of the network device being no longer associated with the low-power wireless network.

21. A first network device for communicating with a low-power wireless network, the network device comprising:
a battery;
a wireless interface; and
a processing unit coupled with the battery and the wireless interface, wherein the processing unit is configured to cause the first network device to:
create at least one wireless connection to associate the first network device to the low-power wireless network;
periodically scan for beacons at a first scanning rate when the at least one wireless connection is maintained with the low-power wireless network;
determine that the first network device has lost the at least one wireless connection with the low-power wireless network;
periodically scan for beacons at a second scanning rate for a certain period of time after determining that the first network device has lost the at least one wireless connection with the low-power wireless network, wherein the second scanning rate is higher than the first scanning rate; and
periodically scan for beacons at a third scanning rate if, after the certain period of time, the first network device has not created a new wireless connection with the low-power wireless network.

22. The first network device for communicating with the low-power wireless network recited in claim 21, wherein the processing unit is configured to cause the first network device to create the at least one wireless connection with either or both of a second network device and a third network device.

23. The first network device for communicating with the low-power wireless network recited in claim 21, wherein the processing unit is configured to cause the first network device to:
attempt to create a new wireless connection if a beacon is detected; and
cause the first network device to omit a certain number of scans if the new wireless connection is not created.

24. The first network device for communicating with the low-power wireless network recited in claim 23, wherein the processing unit is configured to cause the first network device to:
skip a first number of scans if the attempt to create the new wireless connection occurs while the first network device is scanning at the second scanning rate; and skip a second number of scans if the attempt to create the new wireless connection occurs while the first network device is scanning at the third scanning rate.

25. The first network device for communicating with the low-power wireless network recited in claim 21, further including a memory, wherein the processing unit is configured to cause the first network device to store information regarding at least one other network device in the memory.

26. The first network device for communicating with the low-power wireless network recited in claim 25, wherein:
the information regarding the at least one other network devices includes a timestamp; and
the processing unit is configured to cause the first network device to scan for beacons at a time based, at least in part, on the timestamp.

27. The first network device for communicating with the low-power wireless network recited in claim 21, wherein the processing unit is configured to cause the first network device to send a value, using the wireless interface, indicative of a preference corresponding to connecting with the first network device.

28. The first network device for communicating with the low-power wireless network recited in claim 27, wherein:
the value comprises a first value; and
the processing unit is configured to cause the first network device to send a second value, using the wireless interface, after the determining that the first network device has lost the at least one wireless connection with the low-power wireless network, wherein the second value is indicative of a decreased preference corresponding to connecting with the first network device.

29. The first network device for communicating with the low-power wireless network recited in claim 27, further comprising at least one sensor communicatively coupled with the processing unit.

* * * * *